United States Patent [19]

Nakano et al.

[11] Patent Number: 5,206,858
[45] Date of Patent: Apr. 27, 1993

[54] TRANSMISSION METHOD AND CIRCUIT OF VIRTUAL CONTAINER USING ASYNCHRONOUS TRANSFER MODE

[75] Inventors: Yukio Nakano, Hachioji; Takashi Mori; Tadayuki Kanno, both of Yokohama, all of Japan

[73] Assignee: Hitachi, Ltd., Tokyo, Japan

[21] Appl. No.: 747,137

[22] Filed: Aug. 19, 1991

[30] Foreign Application Priority Data

Aug. 17, 1990 [JP] Japan ................................. 2-215711

[51] Int. Cl.[5] .............................................. H04J 3/02
[52] U.S. Cl. ..................................... 370/94.1; 370/60; 370/94.2; 370/110.1
[58] Field of Search ................... 370/94.1, 60, 94.2, 370/110.1

[56] References Cited

U.S. PATENT DOCUMENTS 4,456,989 6/1984 Johnson et al. ............. 370/94.2 X
5,007,045 4/1991 Tsuzuki ........................ 370/94.1
5,050,166 9/1991 Cantoni et al. ............... 370/94.1

FOREIGN PATENT DOCUMENTS 0379095 7/1990 European Pat. Off. .
0387543 9/1990 European Pat. Off. .

OTHER PUBLICATIONS

Watanabe et al. "A realization of adaptation for continuous bit rate communication in an ATM network" National Convention of the Institute of Electronics, Information, and Communication Engineers, Mar. 1990 CCITT Recommendation G.709, pp. 131-143.

Primary Examiner—Douglas W. Olms
Assistant Examiner—Russell W. Blum
Attorney, Agent, or Firm—Antonelli, Terry, Stout & Kraus

[57] ABSTRACT

A method of mapping a virtual container multiplexed with a pointer indicating a first bit position in a transmission frame onto an asynchronous transfer mode cell and transmitting the virtual container thus converted. The method includes the steps of deriving a first bit position of the virtual container in the transmission frame from the value of the pointer of the virtual container, mapping the virtual container onto information fields of cells, deriving a first bit position of the virtual container within a cell information field of the asynchronous transfer mode cell from the first bit position information in the frame, and writing the first bit position information within the cell information field and information contained in the pointer into a field which has a fixed phase relationship with respect to a cell header and transmitting the cells.

4 Claims, 3 Drawing Sheets

TRANSMISSION METHOD AND CIRCUIT OF VIRTUAL CONTAINER USING ASYNCHRONOUS TRANSFER MODE

BACKGROUND OF THE INVENTION

The present invention relates to a method of transmitting a virtual container of a synchronous transfer mode by using a network of an asynchronous transfer mode.

As a conventional method of transmitting signals of a synchronous transfer mode by using a network of an asynchronous transfer mode, there has been known a method of dividing a bit stream per one cell size to transmit the bit stream thus divided as described in Watanabe etc., "A realization of adaptation for continuous bit rate communication in a ATM network", National Convention of The Institute of Electronics, Information and Communication Engineers of Japan, March 1990, Paper B-457. In this method, a bit stream is transparently transmitted independently of the frame structure of information. Boundaries between frames of the bit stream are discriminated by using frame synchronization patterns inserted in the bit stream.

In the synchronous digital hierarchy prescribed in CCITT (International Telegraph and Telephone Consultative Committee) Recommendation G.709, a virtual container having multiplexed information is mapped onto a transmission frame and transmitted. In this case, the boundary or first bit position of a virtual container within a transmission frame is indicated by using a pointer which is a frame phase identifier fixedly arranged in the transmission frame. That is to say, the boundary of the frame of a virtual container is given in the synchronous digital hierarchy of G.709 by the relative relation with respect to the transmission frame instead of the frame synchronization pattern. In case no transmission frames are present, the boundary of the frame must be discriminated by some other method.

The case where virtual containers are transmitted by using a network of an asynchronous transfer mode is also one of examples in which transmission frames of a synchronous digital hierarchy are not used. In a system in which a bit stream is transparently transmitted such as the above described conventional method, the boundary of the frame of a virtual container cannot be discriminated on the receiving side. Further, a method of providing the boundary of the frame of a virtual container with a frame synchronization pattern in dividing a virtual container into cells of an asynchronous transfer mode can be easily considered. In this method, however, alteration of size of a virtual container and rapid alteration of a virtual container using a new data flag, which are features of the pointer of the synchronous digital hierarchy, cannot be made.

SUMMARY OF THE INVENTION

An object of the present invention is to provide a transmission method of a virtual container using an asynchronous transfer mode, which makes it possible to alter the size of a virtual container and rapidly alter the phase of a virtual container using a new data flag and which makes it possible to discriminate the boundary of the frame of the virtual container on the receiving side.

In accordance with the present invention, the above described problem is solved by a method of mapping a virtual container multiplexed with a pointer indicating a first bit position in a transmission frame onto an asynchronous transfer mode cell and transmitting the virtual container thus converted, comprising the steps of deriving a first bit position of the virtual container in the transmission frame from the value of the pointer of the virtual container, mapping the virtual container onto information fields of cells, deriving a first bit position of the virtual container signal within a cell information field of the asynchronous transfer mode from the first bit position information in the frame, and writing the first bit position information within the cell information field and information contained in the pointer into a field which has a fixed phase relationship with respect to a cell header and transmitting the cells.

The first bit position in the information field of the cell of the virtual container at the time when the virtual container is mapped onto information fields of cells is written into a field which has a fixed phase relationship with respect to the cell header and transmitted to the receiving side. Further, information contained in the pointer is also transmitted to the receiving side. Therefore, alteration of the size of the virtual container and rapid alteration of the phase of the virtual container using a new data flag, which are functions of the pointer of a synchronous digital hierarchy, become possible.

BRIEF DESCRIPTION OF THE DRAWINGS

FIGS. 2A to 4 are diagrams showing the frame configuration used in the embodiment.

DESCRIPTION OF THE PREFERRED EMBODIMENTS

Figure 1:
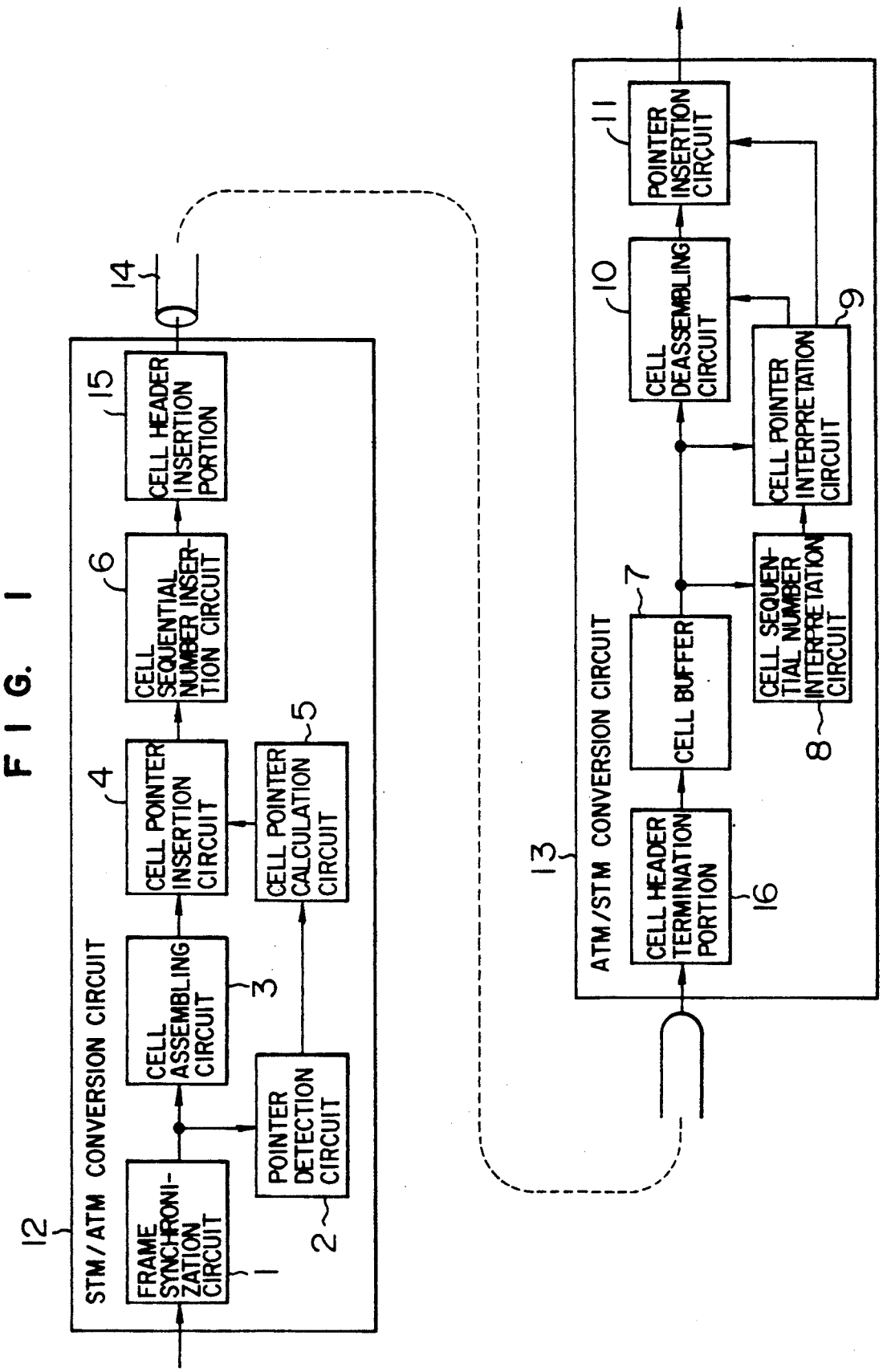
FIG. 1 is a diagram showing the configuration of an embodiment of the present invention.

An embodiment of the present invention will hereafter be described by referring to FIG. 1. A first embodiment of the present invention comprises an STM/ATM conversion circuit 12, an ATM transmission line 14, and an ATM/STM conversion circuit 13. The STM/ATM conversion circuit 12 comprises a frame synchronization circuit 1, a pointer detection circuit 2, a cell assembling circuit 3, a cell pointer insertion circuit 4, a cell pointer calculation circuit 5, a cell sequential number insertion circuit 6, and a cell header insertion portion 15. The ATM/STM conversion circuit 13 comprises a cell buffer 7, a cell sequential number interpretation circuit 8, a cell pointer interpretation circuit 9, a cell deassembling circuit 10, a pointer insertion circuit 11, and a cell header termination portion 16.

Figure 2:
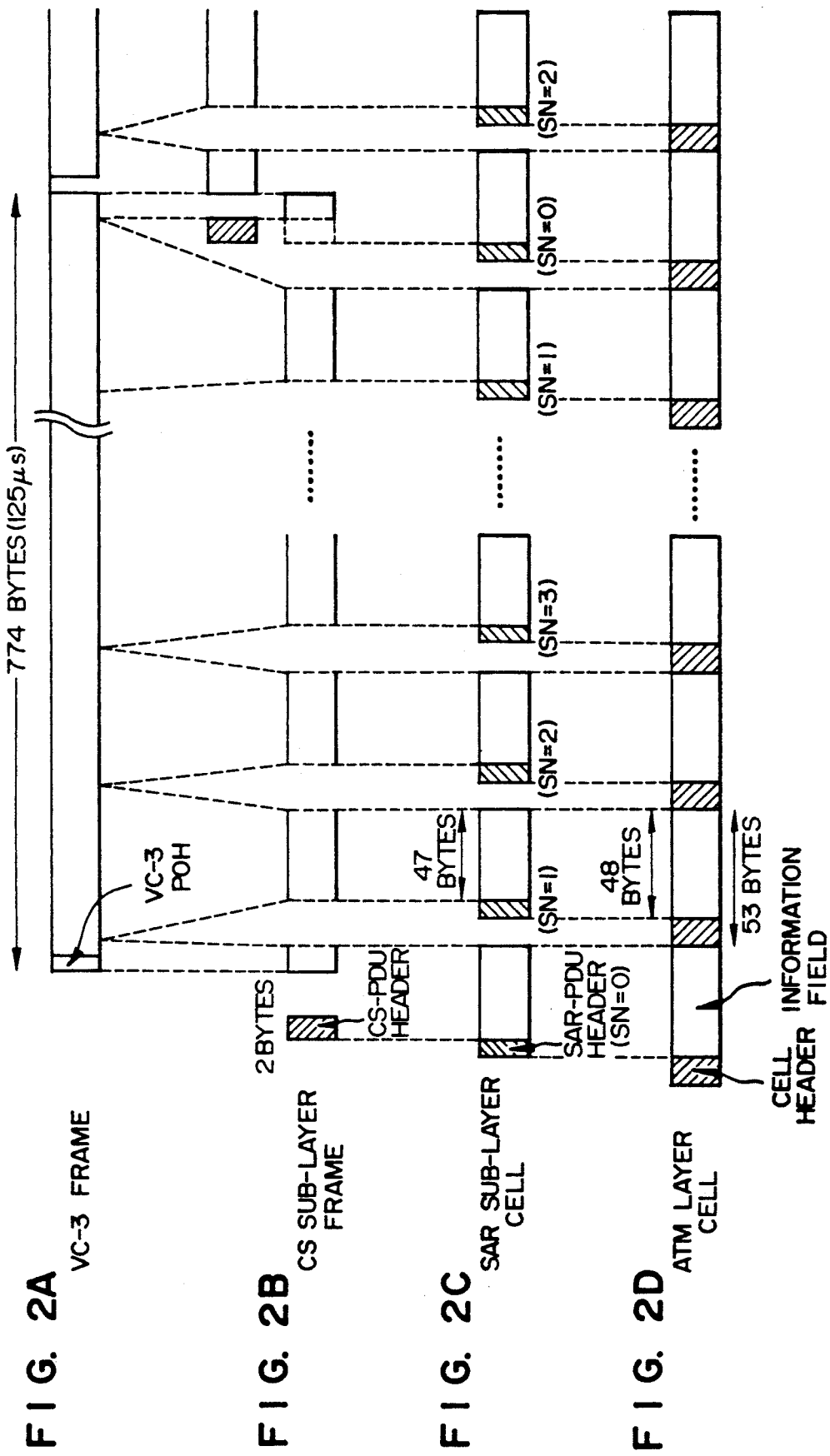
Figure 3:
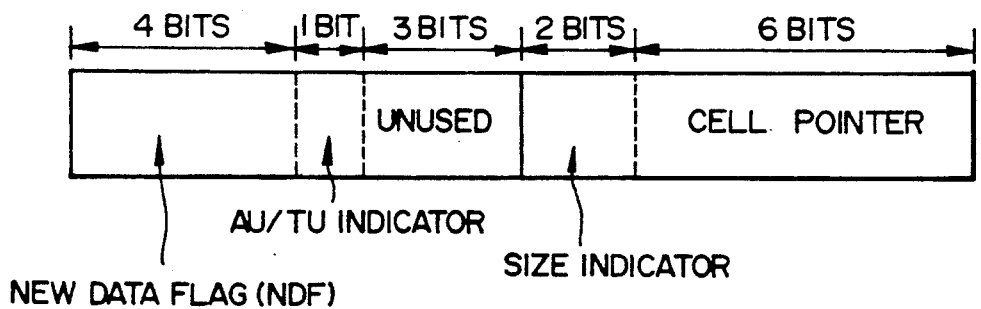
Figure 4:
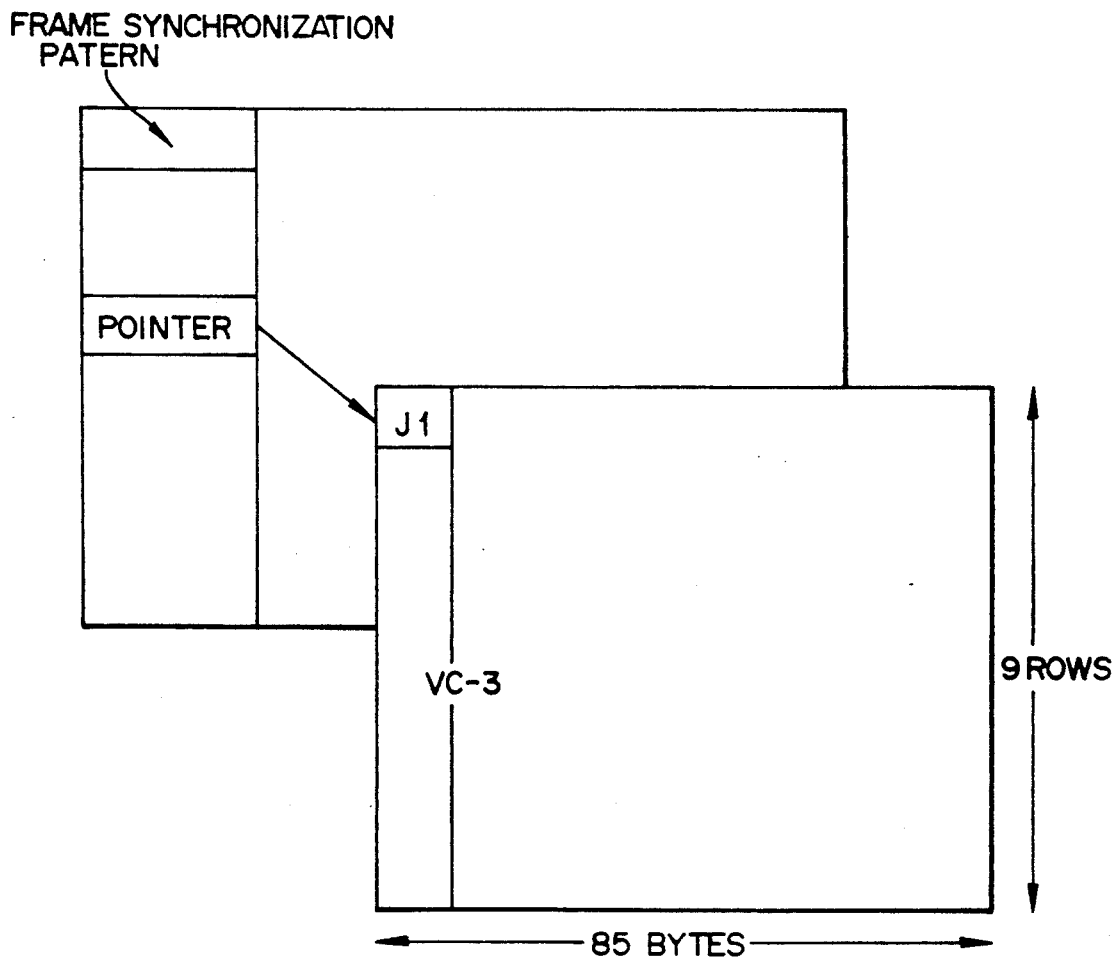

Operation of the present embodiment will now be described by referring to FIGS. 2 to 4. A signal of a synchronous transfer mode (STM) having a frame configuration as shown in FIG. 4 is inputted to the frame synchronization circuit 1. After being subjected to frame synchronization, this signal is fed to the pointer detection circuit 2 and the cell assembling circuit 3. In the cell assembling circuit 3, a virtual container (VC-3) is divided per one cell length as shown in FIGS. 2A and 2B. In the pointer detection circuit 2, the value of a pointer in the frame configuration of FIG. 4 is read to derive the first bit position of the virtual container. This value is sent to the cell pointer calculation circuit 5. In the cell pointer calculation circuit 5, the first bit position of the cellulated virtual container in the cells is derived from the first bit position of the virtual container having the frame configuration as shown in FIG. 4. The first bit position thus derived is sent to the cell pointer insertion circuit 4 together with a new data flag and a size indicator accompanying the pointer, as a cell pointer value. In the cell pointer insertion circuit 4, the cell pointer value, the new data flag, and the size indicator are put in a field fixed with an ATM cell header as a CS-PDU header as shown in FIG. 2B. FIG. 3 shows contents of the CS-PDU header. The CS-PDU header is inserted into only a cell having the first bit of the virtual container. In the cell sequential number insertion circuit 6, cyclic numbers 1 to 15 are given to SAR-PDU headers as a cell number as shown in FIG. 2C. However, the cell in which the CS-PDU header is inserted is provided with number 0 so that the position of the CS-PDU header may be discriminated on the receiving side. In the cell header insertion portion 15, the cell provided with the cell number is provided with a cell header as shown in FIG. 2D and sent to the ATM transmission line 14. In the cell header termination portion 16, the cell is received from the ATM transmission line 14 and subjected to cell header processing, and thereafter the information field is sent to the cell buffer 7. In the cell buffer 7, cell delay deviation on the ATM transmission line 14 is absorbed. In the cell sequential number interpretation circuit 8, the cell number of the SAR-PDU as shown in FIG. 2C is read to know the position of the CS-PDU header. In the cell pointer interpretation circuit 9, contents of the CS-PDU header are interpreted. The kind and the first bit portion of the virtual container are transmitted to the cell deassembling circuit 10 and the pointer insertion circuit 11 by the cell pointer interpretation circuit 9. In the cell deassembling circuit 10, the SAR-PDU headers and the CS-PDU header are removed to regenerate the virtual container. In the pointer insertion circuit 11, the pointer value is given to the virtual container and the frame configuration of FIG. 4 is reproduced.

In the present invention, the pointer value indicating the frame phase of the virtual container in the cells is derived and transmitted in the header of the cell of the asynchronous transfer mode together with the information contained in the pointer. Therefore, alteration of the size of the virtual container and rapid alteration of the phase of the virtual container using a new data flag, which are features of the pointer of a synchronous digital hierarchy, become possible.

We claim:

1. A method for mapping a virtual container multiplexed with a pointer indicating a first bit position in a transmission frame onto an asynchronous transfer mode and for transmitting the virtual container thus converted, said method comprising the steps of:

deriving a first bit position of said virtual container in said transmission frame from the value of said pointer of said virtual container;

mapping said virtual container onto information fields of cells;

deriving a first bit position of said virtual container within a cell information field of the asynchronous transfer mode cell from said first bit position information in the frame; and writing said first bit position information within the cell information field and information contained in said pointer into a field which has a fixed phase relationship with respect to a cell header and transmitting the cells.

2. A transmission method according to claim 1, wherein said field which has a fixed phase relationship with respect to a cell header, into which said first bit position information within the cell information field and information contained in said pointer are written, is disposed only in a cell in which the first bit position of said virtual container is present.

3. A transmission method according to claim 1, wherein cyclic numbers are allotted to said cells as cell numbers in accordance with the order of cell transmission, and a violated code for said cyclic number is allotted as the cell number to the cell having a field which has a fixed phase relationship with respect to a cell header into which said first bit position information within the cell information field and information contained in said pointer are written.

4. A virtual container transmission circuit using an asynchronous transfer mode, comprising:

a conversion circuit for converting a virtual container; and a regeneration circuit for regenerating a virtual container;

said conversion circuit comprising:

a pointer detecting circuit for deriving a first bit position of a virtual container in a transmission frame from the value of a pointer of said virtual container, a cell assembling circuit for mapping said virtual container onto information fields of cells, a cell pointer insertion circuit for deriving information of a first bit position of said virtual container within a cell information field of an asynchronous transfer mode cell from the output of said pointer detection circuit and for inserting said information of the first bit position of said virtual container signal thus derived into a cell as a cell pointer;

said regeneration circuit comprising:

a buffer for receiving cells transmitted from said conversion circuit and for temporarily storing the cells, a cell disassembling circuit for disassembling said cells and for regenerating the virtual container, a cell pointer interpretation circuit for detecting said cell pointer, and a pointer insertion circuit for deriving a pointer from the output of said cell pointer interpretation circuit and for supplying the pointer to the virtual container.

* * * * *